US012675437B2

(12) United States Patent
Zhang

(10) Patent No.: US 12,675,437 B2
(45) Date of Patent: Jul. 7, 2026

(54) METHOD, DEVICE, AND COMPUTER PROGRAM PRODUCT FOR TRANSMITTING DATA

(71) Applicant: Dell Products L.P., Round Rock, TX (US)

(72) Inventor: Weibing Zhang, Beijing (CN)

(73) Assignee: Dell Products L.P., Round Rock, TX (US)

( * ) Notice: Subject to any disclaimer, the term of this patent is extended or adjusted under 35 U.S.C. 154(b) by 199 days.

(21) Appl. No.: 18/644,607

(22) Filed: Apr. 24, 2024

(65) Prior Publication Data

US 2025/0130974 A1      Apr. 24, 2025

(30) Foreign Application Priority Data

Oct. 20, 2023    (CN) .......................... 202311370506.7

(51) Int. Cl.
*G06F 16/13* (2019.01)
*G06F 16/16* (2019.01)
*G06F 16/182* (2019.01)

(52) U.S. Cl.
CPC .......... *G06F 16/137* (2019.01); *G06F 16/164* (2019.01); *G06F 16/1824* (2019.01)

(58) Field of Classification Search
CPC ... G06F 16/137; G06F 16/164; G06F 16/1824
See application file for complete search history.

(56) References Cited

U.S. PATENT DOCUMENTS

| | | | | |
|---|---|---|---|---|
| 8,560,552 | B2 * | 10/2013 | Fortier ................. | H04W 28/06 |
| | | | | 707/747 |
| 10,776,317 | B1 * | 9/2020 | Veeraswamy ......... | G06F 3/0673 |
| 10,838,634 | B1 * | 11/2020 | Bassov .................. | G06F 3/067 |
| 10,853,257 | B1 * | 12/2020 | Yu .......................... | G06F 3/0649 |
| 11,860,834 | B1 | 1/2024 | Bassov et al. | |
| 2018/0004668 | A1 * | 1/2018 | Azizi .................... | G06F 3/0608 |
| 2019/0220363 | A1 | 7/2019 | Zhang et al. | |
| 2019/0324656 | A1 | 10/2019 | Xiao et al. | |
| 2019/0332301 | A1 | 10/2019 | Yang et al. | |
| 2020/0099721 | A1 * | 3/2020 | Golan .................... | H04L 63/20 |
| 2020/0142628 | A1 | 5/2020 | Armangau et al. | |
| 2022/0179830 | A1 | 6/2022 | Pu et al. | |
| 2024/0095358 | A1 | 3/2024 | Zhang et al. | |
| 2024/0311472 | A1 | 9/2024 | Zhang et al. | |

* cited by examiner

*Primary Examiner* — Tarek Chbouki
(74) *Attorney, Agent, or Firm* — BainwoodHuang

(57) ABSTRACT

A technique for transmitting data involves creating a shared hash set for sharing pattern data between a protocol layer and an input/output (IO) path layer, wherein the shared hash set stores pattern keys and pattern content for use in pattern detection. The technique further involves receiving, by the protocol layer, a pattern data block from a client, wherein the pattern data block comprises the pattern data and non-pattern data. The technique further involves transmitting, by the protocol layer, the pattern data block to the IO path layer. The technique further involves writing the pattern data block to a common block file system (CBFS) layer.

20 Claims, 7 Drawing Sheets

200

```
struct PatternSkeleton {
    DQueueLink<PatternElement> hashlink;
    PatternSkeleton *prev;
    PatternSkeleton *next;
    ulong64     patternContent;    // 8-byte pattern content
    uint        patternKey;
    uint        patternHitCnt;
    Boolean_t   isKnownPatternInSMB;   // Indicating whether
    the pattern is known in the SMB Buffer_Cached *buffer;   // Buffer to be transmitted. For
    the pattern data, it will be NULL because patternContent
    and patternKey are used to represent the pattern data.
};
```

Creating a shared hash set for sharing pattern data between a protocol layer and an input/output (IO) path layer

604

Receiving, by the protocol layer, a pattern data block from a client

606

Transmitting, by the protocol layer, the pattern data block to the IO path layer

608

Writing the pattern data block to a common block file system (CBFS) layer

700

METHOD, DEVICE, AND COMPUTER PROGRAM PRODUCT FOR TRANSMITTING DATA

CROSS-REFERENCE TO RELATED APPLICATION

This application claims priority to Chinese Patent Application No. CN202311370506.7, on file at the China National Intellectual Property Administration (CNIPA), having a filing date of Oct. 20, 2023, and having "METHODS, DEVICES AND COMPUTER PROGRAM PRODUCTS FOR TRANSMITTING DATA" as a title, the contents and teachings of which are herein incorporated by reference in their entirety.

TECHNICAL FIELD

The present application relates to the field of data storage, and more specifically, to a method, a device, and a computer program product for transmitting data.

BACKGROUND

In-line pattern detection (ILPD) is a function used in many storage systems to improve data reduction. When a storage system performs ILPD, it first performs a hash lookup to find a match with an input/output (IO) data unit. If a match is found through hash lookup, a complete bit-by-bit comparison of the entire data unit is required and, if all matches, valid pattern data is found.

To support the protocol layer transmission of pattern data, server message block (SMB) pattern IO has been designed specifically for SMB compression as a new function. Similar to data compression, pattern data IO can save the amount of data that must be transmitted over the line, and the bandwidth it consumes is significantly reduced, thus resulting in less transmission time.

SUMMARY OF THE INVENTION

Embodiments of the present application provide a method, a device, and a computer program product for transmitting pattern data. In embodiments of the present disclosure, pattern data information is shared between a protocol layer and an IO path layer. When a client writes pattern data to a server, the server can utilize pattern detection results from the client. In this way, the memory for the pattern IO buffer will be saved for pattern IO, and CPU resources for redundant pattern detection will also be saved. In addition, there can be an improvement in IO response time because fewer operations are required.

According to a first aspect of embodiments of the present application, a method for transmitting data is provided, the method comprising: creating a shared hash set for sharing pattern data between a protocol layer and an IO path layer, wherein the shared hash set stores pattern keys and pattern content for use in pattern detection; receiving, by the protocol layer, a pattern data block from a client, wherein the pattern data block comprises the pattern data and non-pattern data; transmitting, by the protocol layer, the pattern data block to the IO path layer; and writing the pattern data block to a common block file system (CBFS) layer.

According to a second aspect of embodiments of the present application, an electronic device is provided, comprising:

at least one processor; and a memory coupled to the at least one processor and having instructions stored therein, wherein the instructions, when executed by the at least one processor, cause the electronic device to perform actions comprising: creating a shared hash set for sharing pattern data between a protocol layer and an IO path layer, wherein the shared hash set stores pattern keys and pattern content for use in pattern detection; receiving, by the protocol layer, a pattern data block from a client, wherein the pattern data block comprises the pattern data and non-pattern data; transmitting, by the protocol layer, the pattern data block to the IO path layer; and writing the pattern data block to a common block file system (CBFS) layer.

According to a third aspect of embodiments of the present application, a computer program product is provided, which is tangibly stored on a non-volatile computer-readable medium and comprises machine-executable instructions, wherein the machine-executable instructions, when executed, cause the machine to perform actions comprising: creating a shared hash set for sharing pattern data between a protocol layer and an IO path layer, wherein the shared hash set stores pattern keys and pattern content for use in pattern detection; receiving, by the protocol layer, a pattern data block from a client, wherein the pattern data block comprises the pattern data and non-pattern data; transmitting, by the protocol layer, the pattern data block to the IO path layer; and writing the pattern data block to a common block file system (CBFS) layer.

It should be understood that the content described in the Summary of the Invention part is neither intended to limit key or essential features of the embodiments of the present disclosure, nor intended to limit the scope of the present disclosure. Other features of the present disclosure will become readily understood from the following description.

BRIEF DESCRIPTION OF THE DRAWINGS

The above and other features, advantages, and aspects of the embodiments of the present disclosure will become more apparent with reference to the accompanying drawings and the following detailed description. In the accompanying drawings, the same or similar reference numerals always represent the same or similar elements. In the accompanying drawings:

FIG. 2 illustrates a schematic diagram of the description of a skeleton data structure according to some embodiments of the present disclosure;

DETAILED DESCRIPTION

Figure 1:
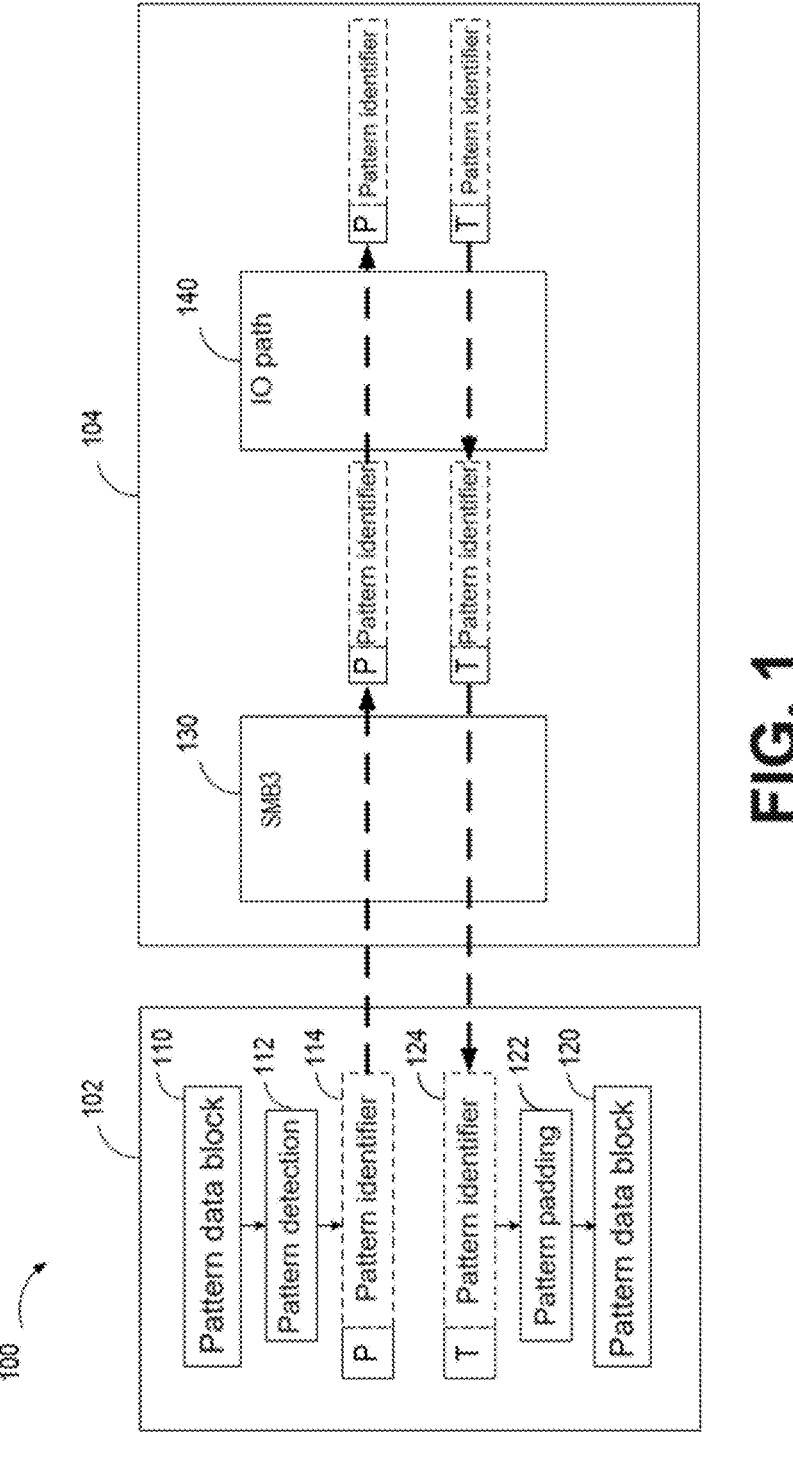
FIG. 1 illustrates a schematic diagram of the overall design of pattern data IO in a protocol layer and an IO path layer according to some embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described below in further detail with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the scope of protection of the present disclosure.

In the description of the embodiments of the present disclosure, the terms "include," "have," and similar expressions thereof should be understood as open-ended inclusion, that is, "including but not limited to." The term "based on" should be understood as "based at least in part on." The terms "embodiment," "one embodiment," or "this embodiment" should be understood as "at least one embodiment."

In-line pattern detection (ILPD) is the capability to recognize a set of static predefined patterns as these patterns are written to objects that have been set. For example, if an input/output (IO) stream consists of sections that are all 0s or 1s, these patterns should not be written to a disk. The system should detect predefined patterns in the memory and should not allocate any space on the disk for pattern data but only update the metadata for the pattern data.

To support the protocol layer transmission of pattern data, server message block (SMB) pattern IO has now been designed specifically for SMB compression as a new function. The SMB compression function is introduced to the operating system of the server, which can reduce the amount of data during the transmission of files over the network. However, it is currently done at the protocol layer. Many storage products support pattern IO in a data path. However, at present, the protocol layer and the IO path layer do not take into account pattern detection results from each other, and the pattern data needs to be expanded in the memory and go through pattern detection processing again. This results in CPU and storage resources in the memory to be wasted for unnecessary pattern detection and pattern padding. In addition, the time spent on these tasks will also lead to longer IO response time.

Therefore, the present disclosure provides a solution for transmitting data. In embodiments of the present disclosure, the pattern data information is shared between the protocol layer and the IO path layer. For both read and write paths, allocation unit aligned pattern data is transmitted with the same pattern identifier across the entire IO stack without intra-server pattern expansion or pattern detection. In this way, storage resources for the pattern IO buffer will be saved for pattern IO, and CPU resources for redundant pattern detection will also be saved. In addition, as fewer operations are required, an improvement in IO response time can also be achieved.

FIG. 1 illustrates a schematic diagram of the overall design of pattern data IO in a protocol layer 130 and an IO path layer 140 according to some embodiments of the present disclosure. As shown in FIG. 1, an environment 100 comprises a client 102 and a server 104. Transmission of pattern data blocks (110, 120) is performed between the client 102 and the server 104, wherein the pattern data blocks (110, 120) include pattern data and non-pattern data.

With the architecture of FIG. 1, according to embodiments of the present application, by creating a shared hash set for sharing pattern data in the input/output (IO) path, the client 102 and the server 104 are enabled to perform data transmission in the read path as described below. First, pattern detection 112 is performed on the pattern data block 110 in the client 102, wherein this pattern detection 112 currently supports 8-byte repeatable patterns, which works specifically by first selecting, from user data in an allocation unit (currently an 8 KB unit), several 8-byte samples with different offsets. If the selected samples all have the same content, a hash lookup is performed to check whether the selected 8 bytes are in a valid pattern. If a predefined pattern is found through the hash lookup, a complete bit-by-bit comparison is performed on the entire 8 KB of data and, if all matches, valid pattern data is found.

After the pattern detection 112 is performed, the pattern data is compressed. In embodiments of the present disclosure, both the client 102 and the server 104 support the SMB2 compression function using the PATTERN_V1 algorithm, so the pattern data is transmitted using the pattern identifier 114 and its repeat count. As a new SMB compression algorithm, the Pattern_V1 algorithm is intended to enable pattern IO. The algorithm is used by the client or server when it is used to compress data having a continuous and equivalent pattern that repeats for a specific count.

In some embodiments, the following SMB compression algorithms are supported in the server and the client, and the workflow thereof for constructing a compressed message according to a compressed message chain is typically as follows: 1. Original data is received from a storage apparatus and a read response is constructed, and a decision must be made as to whether or not to compress this response. 2. Data in a 256K block is compressed. 3. When a decision is made to compress the original data, the data is scanned for any forward and backward pattern repetitions. 4. If there are no forward and backward pattern repetitions and the size of the uncompressed data is less than 1K, the response is not compressed and the uncompressed message is sent to the client. 5. If there are forward and backward pattern repetitions and the size of the remaining uncompressed data (after the reduction of the forward or backward pattern repetitions) is less than 1K, then for the remaining uncompressed data, the compressed payload header should contain NONE. 6. If there are forward or backward pattern repetitions and the size of the remaining uncompressed data is greater than 1K, the data segment associated with the compression instruction is sent to the client. 7. Step 3 is repeated for the next 256K block until the remaining uncompressed data=0.8. If it is compressed data that is being sent, the SMB header and read response structure should be uncompressed. For this data portion, the compressed payload header should not contain NONE. 9. Finally, if the total compressed data+8 (the size of the conversion header)>the uncompressed SMB message, then a response without any compression should be sent.

When the server 104 receives the compressed pattern data block 110 from the client 102 via the protocol layer 130, it is transmitted to the common block file system (CBFS) (not shown in the figures) via the IO path layer 140 with the aid of a doubly linked table (which will be described below in conjunction with FIGS. 2 and 3) having a skeleton data structure, wherein no in-line pattern padding is performed in the protocol layer 130, and no ILPD is performed in the IO path layer 140.

With the architecture of FIG. 1, according to embodiments of the present application, by creating a shared hash set for sharing pattern data in the input/output (IO) path, the client 102 and the server 104 are enabled to perform data transmission in the write path as described below. In response to a data read request supporting pattern IO from the client 102, the server 104 first reads a mapping pointer indicator of the compressed pattern data block 120 in the CBFS layer, and then transmits it, again with the aid of the doubly linked table having the skeleton data structure, to the protocol layer 130 via the IO path layer 140, wherein no in-line pattern padding is performed in the IO path layer 140, and no ILPD is performed in the protocol layer 130. The compressed pattern data block 120 is then sent by the protocol layer 130 to the client 102 and, in the client 102, pattern padding 122 is performed on the compressed pattern data 120 using the pattern identifier 124 and its count, and thus the pattern data block 120 is finally obtained.

In this way, when the client writes the pattern data to a storage server, the server is enabled to utilize the pattern detection results from the client. Similarly, when the client reads data from the storage server, the results of the in-line pattern detection (ILPD) in the IO path layer can also be used to reduce the redundant pattern detection in the protocol layer.

FIG. 2 illustrates a schematic diagram of the description of a skeleton data structure 200 according to some embodiments of the present disclosure. As shown in FIG. 2, the skeleton data structure 200 comprises both pattern content (denoted by patternContent in FIG. 2) and pattern keys (denoted by patternKey in FIG. 2) and further comprises a data buffer (denoted by Buffer_Cached*buffer in FIG. 2). Note that the pattern content patternContent here is an 8-byte repeatable pattern in order to conform to the current commonly used server code. Since SMB currently supports 256 patterns that each have a 1-byte pattern identifier field, the corresponding patterns are selected in ILPD and marked as known to SMB. In addition, for the pattern data, Buffer_Cached*buffer will be NULL because the pattern key and pattern content are used to represent the pattern data, which allows the pattern data to be transmitted through the IO path in the server 104 without occupying the data buffer. In addition, the skeleton data structure 200 further comprises a Boolean-type variable (denoted by Boolean_t in FIG. 2) that indicates whether the pattern is known in the SMB and has a value that is true when the pattern is known in the SMB, and vice versa.

Figure 3:
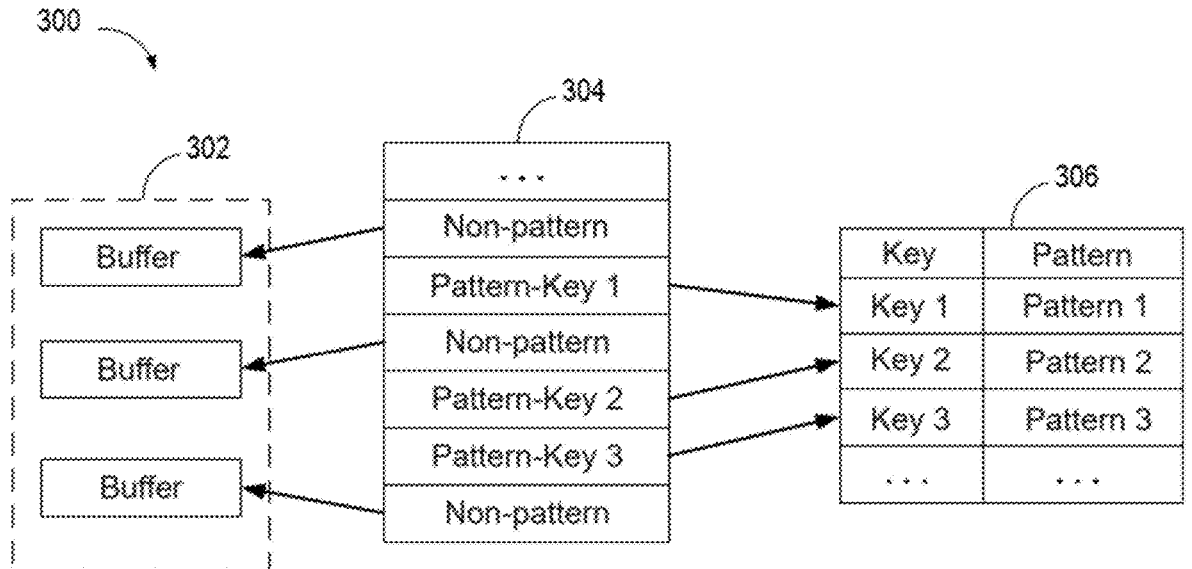
FIG. 3 illustrates a schematic diagram of an example of an IO list that carries pattern data and non-pattern data using a skeleton data structure according to some embodiments of the present disclosure.

FIG. 3 illustrates a schematic diagram of an example 300 of an IO list 304 that carries pattern data and non-pattern data using the skeleton data structure 200 according to some embodiments of the present disclosure. As shown in FIG. 3, for data with known patterns, the IO list 304 carries pattern keys and pattern content, as shown in Table 306 in FIG. 3, to recognize patterns and extend them to the IO buffer. For non-pattern data, the IO list 304 carries data buffers, as shown in the dashed box 302 in FIG. 3. The pattern recognition mentioned above requires the creation of a shared hash set for known patterns in the IO path, where this hash set stores pattern keys and pattern content for use in pattern detection (recognition), which acts similarly to a dictionary, and enables the pattern data to be shared between the protocol layer 130 and the IO path layer 140.

In embodiments of the present disclosure, the IO list 304 is a doubly linked table including pattern data and non-pattern data. In other embodiments, the IO list 304 may also be other types of tables that include pattern data and non-pattern data. The IO list 304 is used in the server 104 to transmit the pattern data blocks (110, 120). In the write path, it carries pattern keys, which are eventually converted to corresponding special metadata in the indirect block. In the read path, it carries pattern content, which is used as pattern identifiers in a message reply to a read request from the client 102.

Figure 4:
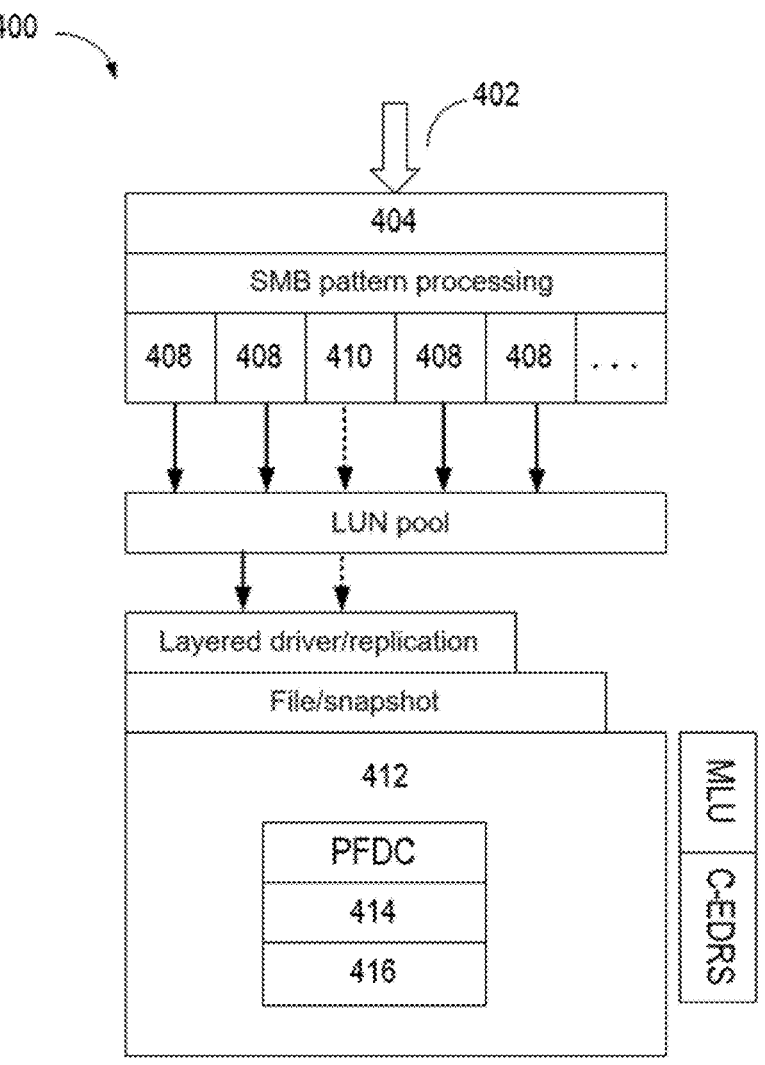
FIG. 4 illustrates a schematic diagram of an example of processing a write path IO list of pattern data according to some embodiments of the present disclosure.

FIG. 4 illustrates a schematic diagram of an example 400 of processing a write path IO list 304 of pattern data according to some embodiments of the present disclosure. In FIG. 4, in response to a write request from the client 102, the server 104 performs a write IO operation 402 for the client 102. This write IO operation 402 comprises checking in the protocol layer 404 the length of the pattern data using allocation unit aligned IO, and performing a conversion from the protocol pattern to the IO path.

In embodiments of the present disclosure, the conversion operation in the write path described above specifically comprises marking the pattern data as a known pattern in response to the pattern data being capable of padding at least one allocation unit (i.e., assigning a true value to Boolean_t in the IO list 304). In addition, it also comprises using a pattern identifier corresponding to a known pattern to set corresponding pattern content to indicate the data. Further, it also comprises adding this pattern content to the IO list 304 for writing to a CBFS layer 412 at a lower layer, where non-pattern data 408 in the IO list 304 is transmitted via a buffer, while pattern data 410 is transmitted via an IO path. These data arrive at the layered driver layer via a logical unit number (LUN) pool and are replicated therein, and then snapshots for these data are created in the file system layer to back up and protect these data. In addition, the conversion operation in the write path also comprises the CBFS layer 412 recognizing a known pattern and skipping the ILPD 414 in the case where the CBFS layer 412 refreshes the data. Furthermore, it also comprises in the case where the core 416 of the CBFS layer 412 submits a change to the metadata, the known pattern (pattern key) is eventually converted to corresponding special metadata within the indirect block.

Figure 5:
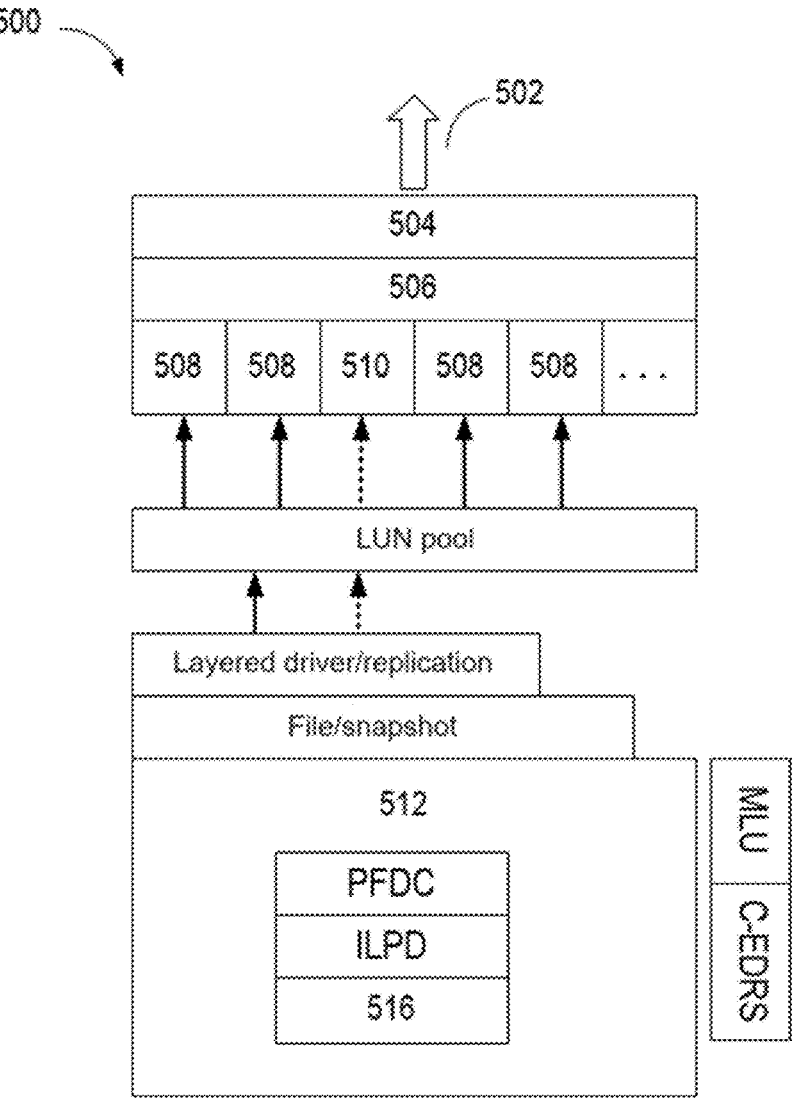
FIG. 5 illustrates a schematic diagram of an example of processing a read path IO list of pattern data according to some embodiments of the present disclosure.

FIG. 5 illustrates a schematic diagram of an example 500 of processing a read path IO list 304 of pattern data according to some embodiments of the present disclosure. In FIG. 5, in response to a data read request supporting pattern IO from the client 102, the server 104 performs a read IO operation 502 for the client 102. This read IO operation 502 comprises reading, in a core 516 of a CBFS layer 512, a mapping pointer indicator for the pattern data using allocation unit aligned IO, and performing a conversion from an IO path to a protocol pattern.

In embodiments of the present disclosure, the conversion operation in the read path described above specifically comprises determining, in the CBFS layer 512, whether a pattern indicated by the mapping pointer indicator for the pattern data is a known pattern in the IO path. In addition, it also comprises marking the pattern as a known pattern in response to the pattern being a known pattern in the IO path (i.e., assigning a true value to Boolean_t in the IO list 304). In addition, it also comprises using a pattern identifier corresponding to the known pattern to set corresponding pattern content to indicate the data. Further, it also comprises adding the pattern content to the IO list 304 for transmission to a protocol layer 504 at an upper layer, where non-pattern data 508 in the IO list 304 is transmitted via a buffer, while pattern data 510 is transmitted via an IO path. These data arrive at the layered driver layer via a logical unit number (LUN) pool and are replicated therein, and then snapshots for these data are created in the file system layer to back up and protect these data. Furthermore, the conversion operation in the read path further comprises filling, in response to the protocol layer 504 packing a data packet for a message reply to a read request, the pattern identifier and the length of the pattern data into a pattern IO header and skipping the pattern detection 506 in the SMB layer.

Figure 6:
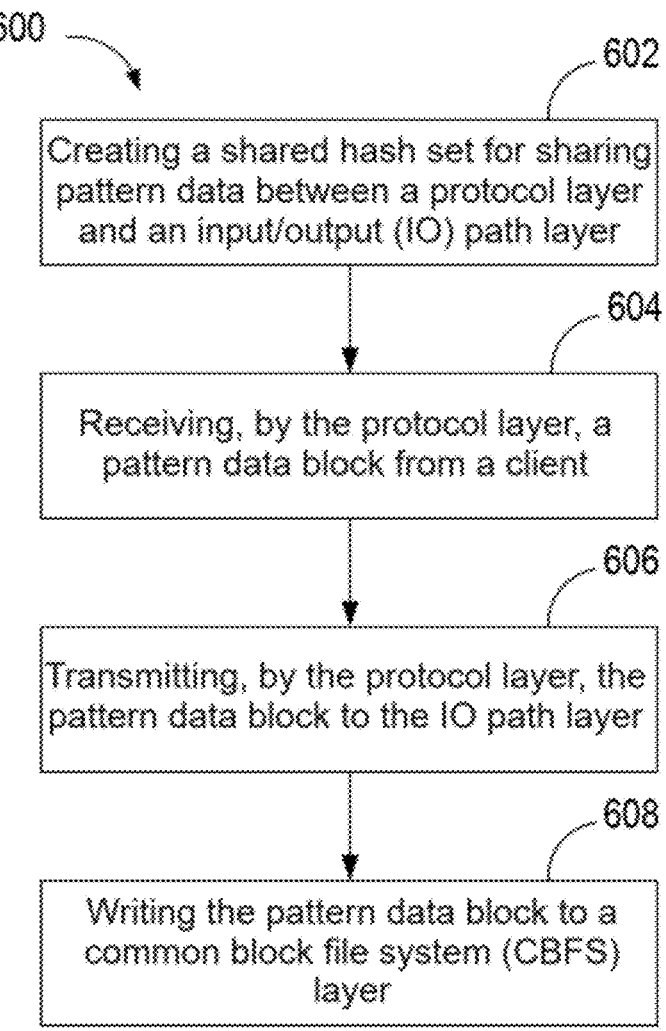
FIG. 6 illustrates a flow chart of a method for transmitting data according to some embodiments of the present disclosure.

FIG. 6 illustrates a flow chart of a method 600 for transmitting data according to some embodiments of the present disclosure. As shown in FIG. 6, at a block 602, the method 600 comprises: creating a shared hash set for sharing pattern data between a protocol layer and an input/output (IO) path layer, wherein the shared hash set stores pattern keys and pattern content for use in pattern detection. For example, in the environment 100 shown in FIG. 1, this shared hash set is created in the IO path in the server 104, and with this shared hash set, pattern detection (recognition) can be performed on the transmitted pattern data blocks (110, 120) in the read path and the write path, so that the pattern data can be shared between the protocol layer 130 and the IO path layer 140, and the same pattern data can be transmitted with the same pattern identifier, thus avoiding redundant pattern expansion or pattern detection in the server 104.

At a block 604, the method 600 comprises: receiving, by the protocol layer, a pattern data block from a client, wherein the pattern data block comprises the pattern data and non-pattern data. For example, in the environment 100 shown in FIG. 1, the protocol layer 130 in the server 104 receives the compressed pattern data block 110 from the client 102, wherein the compressed pattern data block 110 comprises both pattern data identified with the pattern identifier 114 and uncompressed non-pattern data.

At a block 606, the method 600 comprises transmitting, by the protocol layer, the pattern data block to the IO path layer. For example, in the environment 100 shown in FIG. 1, the protocol layer 130 in the server 104 transmits the received compressed pattern data block 110 directly to the IO path layer 140 without in-line pattern padding, and the pattern detection results from the client can be used in the IO path layer 140 without pattern detection.

At a block 608, the method 600 comprises writing the pattern data block to a common block file system (CBFS) layer. For example, in the environment 100 shown in FIG. 1, the pattern identifier 114 and the non-pattern data are transmitted to the CBFS shown in FIG. 4 via the IO path layer 140, where the pattern identifier is stored as corresponding special metadata within the indirect block.

In this way, the pattern data is enabled to be shared between the protocol layer 130 and the IO path layer 140, which avoids redundant pattern expansion or pattern detection in the server 104 and reduces the IO response time.

Figure 7:
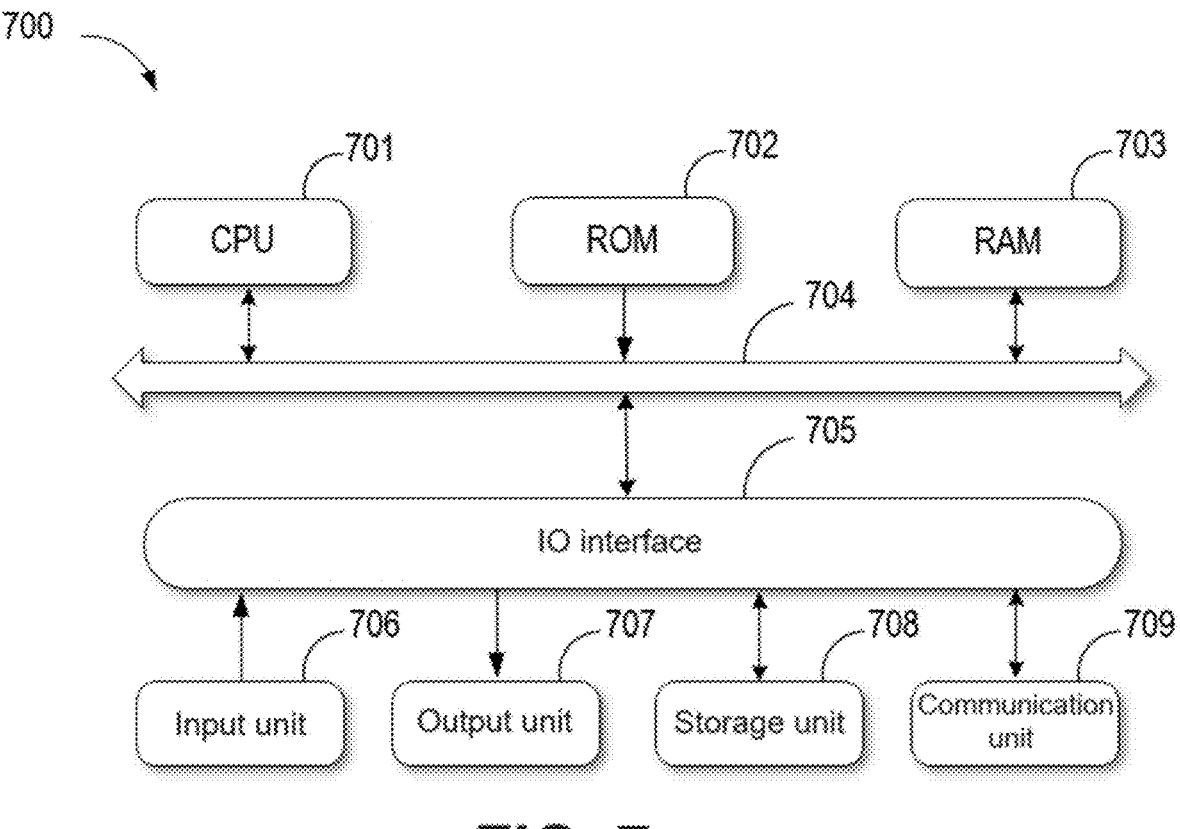
FIG. 7 illustrates a block diagram of a device that can implement a plurality of embodiments of the present disclosure.

FIG. 7 illustrates a schematic block diagram of an example device 700 which can be used to implement embodiments of the present disclosure. As shown in the figure, the device 700 comprises a computing unit 701 that may perform various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in the RAM 703. The computing unit 701, the ROM 702, and the RAM 703 are connected to each other via a bus 704. An Input/Output (I/O) interface 705 is also connected to the bus 704.

A plurality of components in the device 700 are connected to the I/O interface 705, including: an input unit 706, such as a keyboard and a mouse; an output unit 707, such as various types of displays and speakers; a storage unit 708, such as a magnetic disk and an optical disc; and a communication unit 709, such as a network card, a modem, and a wireless communication transceiver. The communication unit 709 allows the device 700 to exchange information/data with other devices via a computer network, such as the Internet, and/or various telecommunication networks.

The computing unit 701 may be various general-purpose and/or special-purpose processing components with processing and computing capabilities. Some examples of the computing unit 701 include, but are not limited to, central processing units (CPUs), graphics processing units (GPUS), various specialized artificial intelligence (AI) computing chips, various computing units for running machine learning model algorithms, digital signal processors (DSPs), and any appropriate processors, controllers, microcontrollers, etc. The computing unit 701 performs various methods and processing described above, such as a method 600. For example, in some embodiments, the method 600 may be implemented as a computer software program that is tangibly included in a machine-readable medium, such as the storage unit 708. In some embodiments, part or all of the computer program may be loaded and/or installed onto the device 700 via the ROM 702 and/or the communication unit 709. When the computer program is loaded to the RAM 703 and executed by the computing unit 701, one or more steps of the method 600 described above may be performed. Alternatively, in other embodiments, the computing unit 701 may be configured to implement the method 600 in any other suitable manners (such as by means of firmware).

The functions described herein above may be performed at least in part by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combinations thereof. Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter recited in the appended claims is not necessarily limited to the particular features or actions described above. Rather, the specific features and actions described above are merely example forms of implementing (or supporting) the claims.

The invention claimed is:

1. A method for transmitting data, the method comprising:
creating a shared hash set for sharing pattern data between a protocol layer and an input/output (IO) path layer, wherein the shared hash set stores pattern keys and pattern content for use in pattern detection;
receiving, by the protocol layer, a pattern data block from a client, wherein the pattern data block comprises the pattern data and non-pattern data;
transmitting, by the protocol layer, the pattern data block to the IO path layer;
writing the pattern data block to a common block file system (CBFS) layer;
checking, in a write path and in response to a data write request supporting pattern IO from the client, the length of the pattern data in the protocol layer using allocation unit aligned IO; and performing a conversion from a protocol pattern to an IO path.

2. The method according to claim 1, further comprising:
reading the pattern data block from the CBFS layer to the IO path layer;
transmitting the pattern data block from the IO path layer to the protocol layer; and
sending, by the protocol layer, the pattern data block to the client.

3. The method according to claim 1, wherein transmitting, by the protocol layer, the pattern data block to the IO path layer comprises:
transmitting the pattern data block using an IO list, wherein
for the pattern data, the IO list carries the pattern keys and the pattern content for use in recognizing a pattern and expanding the pattern into an IO buffer; and
for the non-pattern data, the IO list carries a data buffer.

4. The method according to claim 3, wherein the IO list is a doubly linked table which comprises the pattern data and the non-pattern data.

5. The method according to claim 3, wherein the IO list carries a pattern key in the write path, the pattern key being converted to corresponding metadata in an indirect block.

6. The method according to claim 3, wherein the IO list carries the pattern content in a read path, the pattern content being used as a pattern identifier in a message reply to a read request.

7. The method according to claim 5, wherein performing the conversion from the protocol pattern to the IO path comprises:
marking the pattern data as a known pattern in response to the pattern data being capable of padding at least one allocation unit;
using a pattern identifier corresponding to the known pattern to set corresponding pattern content to indicate the data;
adding the pattern content to the IO list for writing to the CBFS layer;
in the case where the CBFS layer refreshes the data, recognizing the known pattern and skipping the pattern detection by the CBFS; and
in the case where the CBFS layer submits a change to the metadata, converting the known pattern to corresponding metadata within the indirect block.

8. The method according to claim 7, further comprising:
reading, in the read path and in response to a data read request supporting pattern IO from the client, a mapping pointer indicator for the pattern data in the CBFS layer using allocation unit aligned IO; and
performing a conversion from an IO path to a protocol pattern.

9. The method according to claim 8, wherein performing the conversion from the IO path to the protocol pattern comprises:
determining whether a pattern indicated by the mapping pointer indicator for the pattern data is a known pattern in the IO path layer;
marking the pattern as the known pattern in response to the pattern being the known pattern in the IO path layer;
using a pattern identifier corresponding to the known pattern to set corresponding pattern content to indicate the data;
adding the pattern content to the IO list for transmission to the protocol layer; and
filling, in response to the protocol layer packing a data packet for a message reply to the read request, the pattern identifier and the length of the pattern data into a pattern IO header and skipping the pattern detection.

10. An electronic device, comprising:

at least one processor; and a memory coupled to the at least one processor and having instructions stored thereon, wherein the instructions, when executed by the at least one processor, cause the electronic device to perform actions comprising:

creating a shared hash set for sharing pattern data between a protocol layer and an input/output (IO) path layer, wherein the shared hash set stores pattern keys and pattern content for use in pattern detection;

receiving, by the protocol layer, a pattern data block from a client, wherein the pattern data block comprises the pattern data and non-pattern data;

transmitting, by the protocol layer, the pattern data block to the IO path layer;

writing the pattern data block to a common block file system (CBFS) layer;

reading, in a read path and in response to a data read request supporting pattern IO from the client, a mapping pointer indicator for the pattern data in the CBFS layer using allocation unit aligned IO; and performing a conversion from an IO path to a protocol pattern.

11. The device according to claim 10, further comprising:

reading the pattern data block from the CBFS layer to the IO path layer;

transmitting the pattern data block from the IO path layer to the protocol layer; and sending, by the protocol layer, the pattern data block to the client.

12. The device according to claim 11, wherein transmitting, by the protocol layer, the pattern data block to the IO path layer comprises:

transmitting the pattern data block using an IO list, wherein for the pattern data, the IO list carries the pattern keys and the pattern content for use in recognizing a pattern and expanding the pattern into an IO buffer; and for the non-pattern data, the IO list carries a data buffer.

13. The device according to claim 12, wherein the IO list carries the pattern key in a write path, the pattern key being converted to corresponding metadata in an indirect block.

14. The device according to claim 13, further comprising:

checking, in the write path and in response to a data write request supporting pattern IO from the client, the length of the pattern data in the protocol layer using allocation unit aligned IO; and performing a conversion from a protocol pattern to an IO path.

15. The device according to claim 14, wherein performing the conversion from the protocol pattern to the IO path comprises:

marking the pattern data as a known pattern in response to the pattern data being capable of padding at least one allocation unit;

using a pattern identifier corresponding to the known pattern to set corresponding pattern content to indicate the data;

adding the pattern content to the IO list for writing to the CBFS layer;

in the case where the CBFS layer refreshes the data, recognizing the known pattern and skipping the pattern detection by the CBFS; and in the case where the CBFS layer submits a change to the metadata, converting the known pattern to corresponding metadata within the indirect block.

16. The device according to claim 12, wherein the IO list carries the pattern content in the read path, the pattern content being used as a pattern identifier in a message reply to a read request.

17. The device according to claim 16, wherein performing the conversion from the IO path to the protocol pattern comprises:

determining whether a pattern indicated by the mapping pointer indicator for the pattern data is a known pattern in the IO path layer;

marking the pattern as the known pattern in response to the pattern being the known pattern in the IO path layer;

using a pattern identifier corresponding to the known pattern to set corresponding pattern content to indicate the data;

adding the pattern content to the IO list for transmission to the protocol layer; and filling, in response to the protocol layer packing a data packet for a message reply to the read request, the pattern identifier and the length of the pattern data into a pattern IO header and skipping the pattern detection.

18. A computer program product having a non-transitory computer readable medium which stores a set of instructions to transmit data; the set of instructions, when carried out by computerized circuitry, causing the computerized circuitry to perform a method of:

creating a shared hash set for sharing pattern data between a protocol layer and an input/output (IO) path layer, wherein the shared hash set stores pattern keys and pattern content for use in pattern detection;

receiving, by the protocol layer, a pattern data block from a client, wherein the pattern data block comprises the pattern data and non-pattern data;

transmitting, by the protocol layer, the pattern data block to the IO path layer;

writing the pattern data block to a common block file system (CBFS) layer;

reading, in a read path and in response to a data read request supporting pattern IO from the client, a mapping pointer indicator for the pattern data in the CBFS layer using allocation unit aligned IO; and performing a conversion from an IO path to a protocol pattern.

19. The computer program product according to claim 18, wherein the method further includes:

reading the pattern data block from the CBFS layer to the IO path layer;

transmitting the pattern data block from the IO path layer to the protocol layer; and sending, by the protocol layer, the pattern data block to the client.

20. The computer program product according to claim 18, wherein transmitting, by the protocol layer, the pattern data block to the IO path layer comprises:

transmitting the pattern data block using an IO list, wherein for the pattern data, the IO list carries the pattern keys and the pattern content for use in recognizing a pattern and expanding the pattern into an IO buffer; and for the non-pattern data, the IO list carries a data buffer; and wherein the IO list carries the pattern content in a read path, the pattern content being used as a pattern identifier in a message reply to a read request.

*    *    *    *    *